United States Patent
Hulme et al.

(10) Patent No.: US 6,927,186 B2
(45) Date of Patent: Aug. 9, 2005

(54) GLASS COMPOSITION INCLUDING SULFIDES HAVING LOW VISIBLE AND IR TRANSMISSION

(75) Inventors: Richard Hulme, Rochester Hills, MI (US); Michael Cable, Sheffield (GB); Ksenia A. Landa, Grosse Ile, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 223 days.

(21) Appl. No.: 10/309,410

(22) Filed: Dec. 4, 2002

(65) Prior Publication Data

US 2004/0110624 A1 Jun. 10, 2004

(51) Int. Cl.$^7$ .............................................. C03C 3/087
(52) U.S. Cl. .............................. 501/70; 501/64; 501/71
(58) Field of Search ............................... 501/70, 71, 64

(56) References Cited

U.S. PATENT DOCUMENTS

| | | | |
|---|---|---|---|
| 3,300,323 A | 1/1967 | Plumat et al. | |
| 3,830,639 A | 8/1974 | Evans et al. | |
| 3,837,831 A | 9/1974 | Moore | |
| 4,312,953 A | 1/1982 | Mills et al. | |
| 5,023,210 A | 6/1991 | Krumwiede et al. | |
| 5,030,594 A | 7/1991 | Heithoff | |
| 5,214,008 A | 5/1993 | Beckwith et al. | |
| 5,258,336 A | 11/1993 | LaMastro et al. | |
| 5,264,400 A | 11/1993 | Nakaguchi et al. | |
| 5,308,805 A | 5/1994 | Baker et al. | |
| 5,318,931 A | 6/1994 | Nakaguchi et al. | |
| 5,320,986 A | 6/1994 | Taniguchi et al. | |
| 5,344,798 A | 9/1994 | Morimoto et al. | |
| 5,346,867 A | 9/1994 | Jones et al. | |
| 5,364,820 A | 11/1994 | Morimoto et al. | |
| 5,411,922 A | 5/1995 | Jones | |
| 5,569,630 A | 10/1996 | Landa et al. | |
| 5,656,560 A | 8/1997 | Stotzel et al. | |
| 5,817,587 A | 10/1998 | Jeanvoine et al. | |
| 5,837,629 A | 11/1998 | Combes et al. | |
| 5,851,940 A | 12/1998 | Boulos et al. | |
| 5,932,502 A | 8/1999 | Longobardo et al. | |
| 6,080,695 A | 6/2000 | Scheffler-Hudlet et al. | |
| 6,103,650 A | 8/2000 | Krumwiede | |
| 6,114,264 A | 9/2000 | Krumwiede et al. | |
| 6,235,666 B1 | 5/2001 | Cochran et al. | |
| RE37,328 E | 8/2001 | Pecoraro et al. | |
| 6,287,998 B1 | 9/2001 | Seto et al. | |
| 6,326,324 B1 | 12/2001 | Sakaguchi et al. | |
| 6,413,893 B1 | 7/2002 | Shelestak et al. | |
| 6,436,860 B2 | 8/2002 | Seto et al. | |

FOREIGN PATENT DOCUMENTS

| | | |
|---|---|---|
| EP | 0 555 552 | 8/1993 |
| EP | 0 947 476 | 10/1999 |
| EP | 0 811 581 | 9/2002 |
| GB | 1 167 135 | 10/1969 |
| WO | WO 00/76928 | 12/2000 |
| WO | WO 02/059052 | 8/2002 |

OTHER PUBLICATIONS

"The Redox Number Concept and Its Use by the Glass Technologist", Simpson et al., Sep. 1977

"Colour Generation and Control In Glass", Bamford, New York 1977, pp. 106–109.

"Coloured Glasses", Weyl, The Society of Glass Technology, 1951, pp. 237–281.

*Primary Examiner*—David Sample
(74) *Attorney, Agent, or Firm*—Nixon & Vanderhye P.C.

(57) ABSTRACT

A soda-lime-silica based privacy glass, having a visible transmission (Lta) of no greater than 25% and an infrared (IR) transmission no greater than 25%, includes the following colorants in addition to the base glass:

total iron (expressed as $Fe_2O_3$): 0.1 to 1.0%
  cobalt oxide (e.g., $Co_3O_4$): 0 to 1,000 ppm
  sulfides ($S^{2-}$): 0.0001 to 0.10%.

In certain other embodiments the visible transmission may be higher, but low IR transmission is still realized.

31 Claims, No Drawings

GLASS COMPOSITION INCLUDING SULFIDES HAVING LOW VISIBLE AND IR TRANSMISSION

This invention relates to glass compositions and methods of making the same. More particularly, this invention in certain example embodiments relates to glass having a low visible transmission (e.g., no greater than about 25%), low IR transmission (e.g., no greater than about 25%), and low UV transmission (e.g., no greater than about 25%). In certain example embodiments, the glass includes sulfides and a low amount of total iron. In other embodiments a higher visible transmission may be desired. Such glass (e.g., grey or amber in color) is useful, for example, as low transmission privacy glass in the context of windows in the automotive industry and/or in architectural applications.

BACKGROUND OF THE INVENTION

Commercial use of "privacy" window in automobiles and/or architectural applications has become more popular over the years. Such glasses are sometimes formed from a standard soda-lime-silica glass composition to which is added various colorants designed to achieve desired color and spectral properties. Desired spectral properties include low visible light transmission (Lta), low infrared (IR) transmission, and/or low ultraviolet (UV) transmission, with these terms being defined as follows:

Lta as visible light transmission,
UV as ultraviolet light transmission, and
IR as infrared light transmission.

One conventional privacy glass is known as "Venus 10." Venus 10 is believed to have the following colorant portion and spectral characteristics at a thickness of about 4 mm:

| Ingredient/Spectral | Amount/Value |
|---|---|
| total iron: | 2.693% (wt. %) |
| cobalt oxide: | 0.0277% (wt. %) |
| chromium oxide: | 0.0012% (wt. %) |
| Lta | 10.24% |
| % UV | 1.35% |
| % IR | 1.76 |
| % FeO | 0.9243 |
| Dom. λ (nm) | 490 |
| Ex. Purity, % | 22.07 |
| L* (D65) | 40.57 |
| a* | −15.6 |
| b* | −4.49 |

While Venus 10 has good color and desirable low visible (Lta), IR, and UV transmission characteristics, it is problematic in that it requires too much total iron (total iron herein is referred to as $Fe_2O_3$), namely about 2.693%. This high amount of total iron is undesirable in that it typically requires a special shallow tank to be used for melting the same (a high amount of total iron is difficult to efficiently melt during the process of glass manufacture on a consistent basis).

Another privacy glass for use in automotive applications is described in commonly owned U.S. Pat. No. 5,932,502 to Longobardo et. al. While the privacy glass of the '502 Patent has desirable visible (Lta), IR and UV transmission characteristics less than 20%, the '502 glass is undesirable in that it requires a rather large amount of total iron in certain examples (e.g., 1.15% or higher in Examples 1–14 not using boric acid). Moreover, the '502 glass requires the use of significant amounts of Se and Cr in order to achieve the desired privacy characteristics.

While the use of amber glass is known for beer bottle applications, such glass compositions typically do not have a combination of satisfactory visible, UV and IR transmission characteristics.

In view of the above, it is apparent that there exists a need in the art for a new glass composition and/or method of making the same which enables low visible, IR and/or UV transmission characteristics to be achieved (a) without needing an undesirably large amount of total iron, and/or (b) without requiring significant amounts of Se, Cr, Er and/or Ni in certain example embodiments.

SUMMARY OF THE INVENTION

An object of certain example embodiments of this invention is to provide a glass (and method of making the same) which has low visible (Lta), infrared (IR), and/or ultraviolet (UV) transmission(s).

Another object of certain example embodiments of this invention is to provide a glass (and method of making the same) which has low visible (Lta), IR, and/or UV transmission(s), and which does not require too much total iron in order to achieve such low transmission(s).

Another object of certain example embodiments of this invention is to provide a glass (and method of making the same) which has low visible (Lta), IR, and/or UV transmission(s), and which does not require too much chromium (Cr), nickel (Ni), erbium (Er) and/or selenium (Se) in order to achieve such low transmission(s). Little or no Cr, Se, Er and/or Ni may be used in such example embodiments.

Another object of certain example embodiments of this invention is to provide a privacy glass which uses sulfides ($S^{2-}$) in combination with iron in order to achieve desired low visible, IR and/or UV transmission characteristics, along with desired coloration. In certain such example embodiments, the glass may include from about 0.0001 to 1.0% sulfides ($S^{2-}$), more preferably from about 0.001 to 0.50% sulfides ($S^{2-}$), even more preferably from about 0.002 to 0.10% sulfides ($S^{2-}$), and most preferably from about 0.002 to 0.05% sulfides ($S^{2-}$). The sulfides in the glass may take various forms, including but not limited to ferric sulfides (FeS), sulfides of sodium, and/or any other suitable type(s) of sulfides.

Another object of certain example embodiments of this invention is to provide a privacy glass including the aforesaid sulfide amount(s) in combination with a rather low amount of total iron. For example, the glass may include total iron (expressed as $Fe_2O_3$) in an amount no greater than about 1.0%, more preferably no greater than about 0.8%, and even more preferably no greater than about 0.6%.

Another object of certain example embodiments of this invention is to provide a glass with desired coloration, which uses from about 0.0001 to 1.0% sulfides ($S^{2-}$), more preferably from about 0.001 to 0.50% sulfides, in combination with from about 0.2 to 0.8% total iron.

It is an object of certain example embodiments of this invention to fulfill one or more of the above-listed objects. Another object of certain example embodiments of this invention is to fulfill one or more of the above-listed needs.

Generally speaking, certain example embodiments of this invention fulfill one or more of the above listed objects and/or needs by providing a glass comprising:

| Ingredient | Wt. % |
|---|---|
| $SiO_2$ | 67–75% |
| $Na_2O$ | 10–20% |
| CaO | 5–15% |
| MgO | 0–8% |
| $Al_2O_3$ | 0–5% |
| $K_2O$ | 0–5% |
| BaO | 0–2% | and a colorant portion comprising (or consisting essentially of in different embodiments):

| | |
|---|---|
| total iron: | 0.1 to 1.0% |
| cobalt oxide: | 0 to 1,000 ppm |
| sulfides ($S^{2-}$): | 0.0001 to 0.10% | wherein the glass has a visible transmission (Lta) no greater than 25%, and an infrared (IR) transmission no greater than 25%.

Certain other example embodiments of this invention fulfill one or more of the above listed needs by providing a glass having a visible transmission no greater than 25% and in infrared (IR) transmission no greater than 25%, the glass including a colorant portion consisting essentially of:

| | |
|---|---|
| total iron: | 0.2 to 0.8% |
| cobalt oxide: | 0 to 1,500 ppm |
| sulfides ($S^{2-}$): | 0.0001 to 1%. |

Certain other example embodiments of this invention fulfill one or more of the above-listed objects by providing a glass having a visible transmission no greater than 20%, an IR transmission no greater than 20%, and a % TS no greater than 20%, wherein the glass includes a colorant portion comprising:

| | |
|---|---|
| total iron: | 0.2 to 0.8% |
| cobalt oxide: | 0 to 1,500 ppm |
| sulfides ($S^{2-}$): | 0.0001 to 1%. |

Certain other example embodiments of this invention fulfill one or more of the above-listed objects by providing method of making privacy glass, the method comprising: causing a batch melt including soda, lime, silica, iron and $Na_2SO_4$ to have a negative batch redox value; and processing the batch so as to form a privacy glass having a visible transmission no greater than 25% and in infrared (IR) transmission no greater than 25%, wherein the privacy glass includes a colorant portion comprising:

| | |
|---|---|
| total iron: | 0.2 to 0.8% |
| cobalt oxide: | 0 to 1,500 ppm |
| sulfides ($S^{2-}$): | 0.0001 to 1%. |

DETAILED DESCRIPTION OF CERTAIN EXAMPLE EMBODIMENTS OF THIS INVENTION

Glasses according to different embodiments of this invention may be used, for example, as privacy glass in the automotive industry (e.g., backlites, side windows, etc.), in architectural applications, and/or in other suitable applications. Such glasses may be grey, amber or otherwise colored in different embodiments of this invention.

Certain glasses according to this invention utilize soda-lime-silica glass as their base composition/glass, to which is added certain ingredients making up a unique colorant portion. An exemplary soda-lime-silica base glass according to certain embodiments of this invention, on a weight percentage basis, includes the following basic ingredients:

TABLE 1

Example Base Glass

| Ingredient | Wt. % |
|---|---|
| $SiO_2$ | 67 to 75% |
| $Na_2O$ | 10 to 20% |
| CaO | 5 to 15% |
| MgO | 0 to 8% |
| $Al_2O_3$ | 0 to 5% |
| $K_2O$ | 0 to 5% |
| BaO | 0 to 2% |

Other minor ingredients, including various conventional and refining aids, such as carbon, gypsum, Epsom salts, SiO and the like may also be included in the base glass. In certain embodiments, for example, glass herein may be made from batch raw materials silica sand, soda ash (or NaOH as a soda source), dolomite, limestone, along with the use of certain refining agents. Especially desirable in certain example embodiments of this invention are one or more reducing agent(s) such as carbon, Si (metallic), silicon monoxide (SiO), calumite, sucrose, and/or any other suitable reducing agent(s). Preferably, soda-lime-silica base glasses herein include by weight from about 10–15% $Na_2O$ and from about 6–12% CaO. While a soda-lime-silica base glass set forth above is preferred in certain embodiments of this invention, this invention is not so limited. Thus, other base glasses may instead be employed in alternative embodiments.

To the base glass (e.g., see example in Table 1 above), the instant invention adds a colorant portion which may cause the resulting glass to have low visible (Lta), IR and/or UV transmission characteristics, while enabling the glass to be made in an efficient manner without the need for too much iron.

In certain example embodiments of this invention, an example colorant portion that is added to the base glass is substantially free of chromium (Cr), nickel (Ni), erbium (Er), and/or selenium (Se) in order to achieve such low transmission(s). In an example embodiment, the glass includes no more than about 0.005% (wt. %) Cr, more preferably no more than about 0.001% Cr, and even more preferably no more than about 0.0001% Cr. In an example embodiment, the glass includes no more than about 0.001% Se, more preferably no more than about 0.0001% Se. In an example embodiment, the glass includes no more than about 0.005% (wt. %) Ni, more preferably no more than about 0.001% Ni, and even more preferably no more than about 0.0001% Ni. In an example embodiment, the glass includes no more than about 0.01% Er, more preferably no more than about 0.001% Er, more preferably no more than about 0.0001% Er. It is noted that the term Cr includes oxides of Cr, and the terms Se, Er and Ni include respective oxides of these elements. While the glass is substantially free of Cr, Er, Ni and/or Se in certain example embodiments of this invention, the invention is not so limited unless specifically claimed (i.e., certain of these elements may be used in significant amounts in certain example embodiments of this invention).

An example colorant portion of a glass according to an example embodiment of this invention is set forth in Table 2 below (in terms of weight percentage of the total glass composition). The colorant portion of certain example embodiments of this invention may consist essentially of, or comprise, the elements listed in Table 2 below:

TABLE 2

| | Example Colorant Portion(s) | | |
|---|---|---|---|
| Ingredient | General (Wt. %) | Preferred (Wt. %) | Best (Wt. %) |
| total iron (expressed as $Fe_2O_3$): | 0.1 to 1.0% | 0.2 to 0.8% | 0.3 to 0.6% |
| cobalt oxide (e.g., $Co_3O_4$): | 0 to 1,000 ppm | 20 to 800 ppm | 50 to 500 ppm |
| sulfides ($S^{2-}$): | 0.0001 to 1.0% | 0.001 to 0.50% | 0.002 to 0.10% |
| selenium (Se): | 0 to 0.0020% | 0 to 0.0010% | 0 to 0.0001% |
| chromium oxide (e.g., $Cr_2O_3$): | 0 to 0.010% | 0 to 0.001% | 0 to 0.0001% |
| erbium oxide (e.g., $Er_2O_3$): | 0 to 0.010% | 0 to 0.001% | 0 to 0.0001% |
| nickel oxide (e.g., NiO): | 0 to 0.005% | 0 to 0.001% | 0 to 0.0001% |

It should be appreciated that small amounts of other materials (e.g., refining aids, melting aids, and/or impurities) may be present in the glass such as manganese, molybdenum, tin, carbon, chlorine, zinc, zirconium, Si, sulfate, fluorine, lithium and/or strontium, without taking away from the purpose(s) and/or goal(s) of the instant invention. It is also noted that slightly more than 1% total iron may be used in certain embodiments of this invention. It is noted that in certain embodiments the upper limit amount of 0.10% sulfides may be used with any of the aforesaid lower limits. In other words, in certain embodiments sulfides may be from 0.0001 to 0.10%, and in other embodiments sulfides may be from 0.001 to 0.10%, and in other embodiments from 0.002 to 0.10%.

The total amount of iron present in the glass and in the colorant portion thereof is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass (i.e., glass redox), and is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Yet another definition of glass redox is based on the ratio of ferrous to total iron (but this definition is not used herein unless expressly stated to the contrary). Iron in the ferrous state ($Fe^{2+}$; FeO) is a blue-green colorant, while iron in the ferric state ($Fe^{3+}$) is a yellow-green colorant. According to certain embodiments of this invention, the colorant portion of the glass composition herein is characterized by a redox value (i.e., $FeO/Fe_2O_3$) of from 0.4 to 0.9, more preferably from about 0.5 to 0.85, and most preferably from 0.6 to 0.8.

Certain coloration herein may be due to a chromophore formed by ferric, sulfide(s) and oxygen ions.

In order to obtain sulfides ($S^{2-}$) in the ultimate glass, sulfur may be added to the glass batch/melt in the form of salt cake ($Na_2SO_4$) in certain embodiments of this invention. Under conventional float glass conditions, the batch redox (as opposed to the glass redox) is characterized by a positive value so that the salt cake added to the batch breaks down as follows in the melt:

Conventional-batch redox positive (+) (e.g., +10 to +20)

$$Na_2SO_4 \rightarrow Na_2O + SO_3 \quad (1)$$

$$SO_3 \rightarrow SO_2 + O_2 \quad (2)$$

where the $Na_2O$ is a glass component, most if not all of which stays in the glass. Some of the $SO_3$ remains in the glass as a refining agent as shown in equation (1), and some is given off as $SO_2$ and $O_2$ emissions as shown in equation (2). The amount of salt cake typically added in float glass manufacturing is around 1%, which results in about 0.25% $SO_3$ remaining in the final glass given the above equations. This $SO_3$ is largely present in the glass in sulfate form, but given conventional processing a very small portion may be in other valence states.

Thus, it can be seen that given conventional float glass processing techniques, the addition of salt cake ($Na_2SO_4$) to the batch does not result in significant amounts of sulfides ($S^{2-}$) in the final glass. However, as explained below, it is possible to adjust the batch redox (i.e., the redox of the batch as opposed to the final glass) in a manner which causes more of the sulfur retained in the glass to be present as sulfides instead of sulfate (i.e., to cause salt cake to break down so as to result in a significant amount of sulfides in the final glass).

In particular, when the batch redox is changed from a conventional positive value to a negative value (e.g., from a positive value of from about +10 to +20, to a negative value of from about 0 to −50, more preferably from about −5 to −35, and most preferably about −15 to −30), salt cake added to the batch is broken down as follows during melting in a manner that may be represented generally:

Batch redox negative (−) (e.g., −5 to −35)

$$Na_2SO_4 + 4C \rightarrow Na_2S + 4CO \quad (3)$$

where the $Na_2S$ is a glass component and thus stays in the glass. Sulfides ($S^{2-}$) other than those of sodium (Na) may of course also be formed in the glass (e.g., sulfides of iron). Thus, it can be seen that by making the batch redox value negative, the salt cake is broken down in the melt as shown in equation (3) so that significant amounts of sulfides ($S^{2-}$) result in the final glass. In order to cause the batch redox to shift from a positive value to a negative value, certain example steps may be taken. For example, according to certain example embodiments of this invention, a smaller amount of iron oxide (an oxidizing agent) is used, a smaller amount of salt cake is used, and/or reducing agent(s) such as carbon, Si, SiO, calumite, melite and/or the like are used in amounts so that a desired negative batch redox value is achieved. The reducing agents tend to decrease the batch redox value, and the lower total iron oxide and/or salt cake also allows the batch redox value to be reduced since iron and salt cake may function as oxidizers. In certain example embodiments of this invention, the amount of salt cake added to the batch is from about 0.1 to 0.7%, more preferably from about 0.2 to 0.6% (less than the 1% typically added in conventional float glass processing). Since less salt cake is added to the batch than in many conventional processes, this advantageously results in lower emissions in certain embodiments of this invention. While salt cake is a preferred form for adding sulfur to the batch in certain embodiments of this invention, the sulfur may be introduced via other form(s) in other embodiments of this invention.

The iron colorant may be added to the glass batch in any suitable manner. In certain example embodiments the iron is added to the batch in the form of rouge, while in other embodiments the iron is added to the batch in the form of melite. Melite in certain example embodiments may consist essentially of about 48–52% $SiO_2$ (e.g., 50%), about 17–21% $Al_2O_3$ (e.g., 19%), about 19–22% total iron (e.g., 21%) with about 75–85% of the iron being in reduced form (FeO), about 3–5% CaO (e.g., 4%), about 0–3% MgO (e.g., 1%), and about 0–3% (Na, K)O. However, unless expressly stated otherwise, the term "melite" as used herein means batch material containing at least iron oxide, CaO, $Al_2O_3$, and $SiO_2$ where the iron oxide makes up at least about 15% of the mixture. When iron is introduced into the batch in the form of melite, much of the iron is already in reduced form (FeO). Thus, adding iron in the form of melite is advantageous in certain example embodiments of this invention since it enables the amount(s) of other reducing agents to be lessened and/or eliminated. In certain example embodiments of this invention, iron may be added to the batch as a combination of two or more materials such as rouge and melite.

It is noted that glasses according to this invention may be made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath). Interaction between the glass and tin can affect the optical properties of a very thin layer just inside the glass in certain instances.

Glasses of this invention, as stated above, may in certain example non-limiting embodiments achieve the following color/solar characteristics characterized by low visible, UV and/or IR transmission; and/or grey or amber color (see Table 3 below). Other colors are possible in other embodiments of this invention.

In certain embodiments, glasses herein include one or more of the following color/solar/redox characteristics when measured at a nominal thickness of from about 1 mm–6mm (and preferably for most uses, at about 3 mm–4mm, wherein 4 mm may be used for a reference but non-limiting thickness in certain instances) as set forth in Table 3. It is noted that the batch redox is for the batch used in making the glass, whereas the glass redox is the redox of the final glass product discussed above:

TABLE 3

Example Transmissive Color/Solar Characteristics/Redox Values

| CHARACTERISTIC | General | More Preferred | Most Preferred |
|---|---|---|---|
| Lta (visible transmittance): | <=25% | <=20% | <=15% |
| $IR_{transmission}$ (% IR): | <=25% | <=20% | <=15% |
| $UV_{transmission}$ (% UV): | <=25% | <=20% | <=15% |
| Dominant λ: | 460–620 nm | 500–580 nm | 540–570 nm |
| Ex. Purity, % (Pe): | 4–60 | 6–50 | 10–30 |
| L* (Ill. D65, 10 deg. observer): | 20–75 | 30–60 | 40–55 |
| a* (Ill. D65, 10 deg. observer): | −30 to +20.0 | −20 to 0 | −15 to −5 |
| b* (Ill. D65, 10 deg. observer): | −20 to +50 | −10 to +45 | 0 to +35 |
| % FeO: | 0.1 to 0.5 | 0.2 to 0.45 | 0.25 to 0.4 |
| % TS: | <=25% | <=20% | <=15% |
| Glass Redox ($FeO/Fe_2O_3$): | 0.4 to 0.9 | 0.5 to 0.85 | 0.6 to 0.8 |
| Batch Redox: | 0 to −50 | −5 to −35 | −15 to −30 |

Glasses of certain embodiments of this invention achieve the above unique characteristics (i.e., desired color and/or solar management properties such as low Lta, % UV, % IR and/or % TS) through the use of the unique colorant portions discussed herein, and/or the introduction of salt cake into the glass batch which has a negatively valued batch redox. This enables the unique solar/color characteristics described above to be achieved without the need for too much total iron, and without the need for significant amounts of Cr, Se, Ni and/or Er.

Cobalt (Co) is a blue colorant, largely present in glass as $Co^{2+}$ ions. However, other oxide states of Co are also possible in glasses according to this invention. It is conventional to add cobalt colorant as $Co_3O_4$ and report its content in this form; even though this may not describe the state of oxidation of Co in the glass. Thus, unless expressly stated to the contrary, the terms cobalt oxide, CoO and $Co_3O_4$ as used herein include not only cobalt in this/these particular oxide state(s), but also include(s) cobalt which may be present in other oxide or non-oxide state(s).

Sulfides ($S^{2-}$) represent a colorant which often produces an amber color (yellow and/or brown) when combined with iron oxide. The sulfides in the glass may take various forms, including but not limited to ferric sulfides (FeS), sulfides of sodium, and/or any other suitable type(s) of sulfides.

While Se often combines with iron as iron selenide (FeSe) in glass to produce brown color, selenium is referred to in the colorant portion herein as "Se" which is meant to include all forms of Se that may exist in the glass. While Se may or may not be used in the colorant portion as discussed above, it is noted that in many embodiments Se need not be present or need only be present in trace amounts. Cr and Ni are also known colorants, and may take certain oxide forms; they may exist in more than one state in the glass and may be present in trace or impurity amounts in certain embodiments of this invention.

EXAMPLES

The glasses of this invention may be made from batch ingredients using well known glass melting and refining techniques. For example, in a conventional batch technique for melting, the following base glass batch was used for the Examples herein (note: the below-listed ingredients in the batch will add up to 100% by weight once oxides thereof are accounted for; thus, they need not add up to one hundred as raw materials—fusion factor of 0.83).

TABLE 4

Base Glass for Examples

| Batch Ingredient for Base Glass | Parts by Wt. |
|---|---|
| sand | 71.5 |
| soda ash | 23.7 |
| dolomite | 18.32 |
| limestone | 6.1 |

For each example, an experimental 100 g glass melt was made in a platinum crucible using a standard electric melting furnace set-up for soda-lime-silica composition. The melting temperature was about 1500 degrees C., the melting time was about 4 hours, the annealing temperature was about 620–680 degrees C., and an annealing time of about 0.5 hrs. was used for allowing cooling to room temperature by inertia after the annealing furnace is shut down. The glass was cast into graphite molds, annealed and cooled down, then ground and polished for visual inspection and spectral measurements. Colorants and other refining agent(s) (e.g., reducing agent(s)) were added to the aforesaid base glass in the examples herein. Salt cake was added to the batch for each example, in order to enable the sulfides to form as explained above. Table 5 below sets for the colorants present in the final glasses (wt. % of total glass) according to the examples herein, as well as certain solar/color/redox characteristics regarding the same. It is noted that the glass redox is for the final glass, whereas the batch redox is for the batch. Lta, a*, b*, and L* were transmissive, and a*, b* and L* data were taken via Ill. D65, 10 deg. observer. Moreover, the salt cake in Table 5 is the amount of salt cake that was added to the batch (not in the final glass), and the reducer(s) in Table 5 were added to the batch. Reducer(s) such as C, Si, SiO, Sn and/or calumite were used in amounts in order to achieve the listed batch redox in each example. The iron was added in the form of melite in Example 1, and in the form of rouge in Example 2.

TABLE 5

Examples: colorants/solar properties/redox

| Element/Property | Ex. 1 | Ex. 2 | Ex. 3 | Ex. 4 |
|---|---|---|---|---|
| total iron ($Fe_2O_3$): | 0.47 | 0.45 | 0.3 | 0.8 |
| cobalt oxide ($Co_3O_4$): | 300 ppm | 260 ppm | 30 ppm | 150 ppm |
| sulfides ($S^{2-}$): | 0.0092 | 0.0072 | 0.002 | 0.002 |
| salt cake in batch: | 0.35 | 0.35 | 0.35 | 0.3 |
| $SO_3$ in glass: | 0.027 | 0.024 | 0.007 | 0.009 |
| glass redox ($FeO/Fe_2O_3$): | 0.75 | 0.73 | 0.47 | 0.62 |
| batch redox: | −10 | −10 | −9 | −8 |
| % FeO: | 0.32–.34 | 0.31–.33 | 0.14–.21 | 0.5 |
| Lta (vis. transmission %): | 11.92 | 18.7 | 57 | 40.8 |
| $IR_{transmission}$ (% IR): | 11.82 | 10.24 | 36 | 6.6 |
| % TS: | 11.71 | 13.52 | 46 | 24.5 |
| L* (D65, 10 deg.): | 39.8 | 49.19 | 80 | 72.8 |
| a* (D65, 10 deg.): | −8.3 | −9.3 | −1 | −12.3 |
| b* (D65, 10 deg.): | 27 | 30 | 5.31 | −13.3 |

Examples 1 and 2 exhibited excellent privacy glass characteristics (i.e., % Lta and % IR both no greater than 25%) and coloration. It can be seen that this was achieved without intentionally adding any Se, Er, Cr or Ni to the batch. However, it can be seen that Example 3 had a higher visible transmission (Lta) of 57% and % IR. It is believed that this is because of the smaller amount of total iron combined with the smaller amount of salt cake added to the batch. Example 4 also realized a good combination of rather high visible transmission (40.8%) and low IR transmission (6.6%).

It is noted that luminous transmittance (Lta) [2 degree observer] is understood in the art, and is used herein in accordance with its known meaning. This term is also known as Ill. A visible transmittance (380–780 nanometers inclusive), and its measurements are made in accordance with CIE Publication 15.2 (1986)) and ASTM E308. The terms, and characteristics, of ultraviolet light transmittance (% UV), infrared energy transmittance (% IR), dominant wavelength (λ), total solar energy transmittance (% TS), and excitation purity (i.e. % "purity", or Pe) are also well understood terms in the art, as are their measurement techniques. Such terms are used herein, in accordance with their well known meaning, e.g., see U.S. Pat. No. 5,308,805. In particular, ultraviolet transmittance (% UV) is measured herein using Parry Moon Air Mass=2 (300–400 nm inclusive, integrated using Simpson's Rule at 10 nm intervals). IR transmittance is conventionally measured using Simpson's Rule and Parry Moon Air Mass=2 over the wavelength range 800–2100 nm inclusive at 50 nm intervals. Dominant wavelength (DW) is calculated and measured conventionally in accord with the aforesaid CIE Publication 15.2 (1986) and ASTM: E 308-90. The term "dominant wavelength" includes both the actual measured wavelength and, where applicable, its calculated complement. Excitation purity (Pe or % "purity") is measured conventionally in accordance with CIE Publication 15.2 (1986) and ASTM: E 308-90.

The glass redox is defined above. However, batch redox is different from glass redox. Batch redox is known in the art as being generally based on the following. Each component of the batch is assigned a redox number, and the batch redox is calculated as the sum total of the same. The calculations are based on the amount of a component per 2,000 kg of sand. The batch redox number is calculated before the glass is made (i.e., from the batch). A detailed discussed of how "batch redox" is determined is provided in *The redox number concept and its use by the glass technologist*, W. Simpson and D. D. Myers (1977 or 1978), the entire disclosure of which is hereby incorporated herein by reference. In contrast, as explained above, the glass redox is calculated after the glass has been made from spectral data, and is a ratio of % FeO (e.g., from a spectrum) to total iron in the glass (e.g., from chemical analysis).

Once given the above disclosure many other features, modifications and improvements will become apparent to the skilled artisan. Such features, modifications and improvements are therefore considered to be a part of this invention, the scope of which is to be determined by the following claims:

What is claimed is:

1. A glass sheet comprising:
a base glass portion comprising:

| Ingredient | Wt. % |
|---|---|
| $SiO_2$ | 67–75% |
| $Na_2O$ | 10–20% |
| CaO | 5–15% |
| MgO | 0–8% |
| $Al_2O_3$ | 0–5% |
| $K_2O$ | 0–5% |
| BaO | 0–2% | and a colorant portion comprising:

| | |
|---|---|
| total iron: | 0.1 to 1.0% |
| cobalt oxide: | 0 to 1,000 ppm |
| sulfides ($S^{2-}$): | 0.0001 to 0.10% | wherein the glass sheet has a visible transmission (Lta) no greater than 25%, an ultraviolet (UV) transmission no greater than 20%, and an infrared (IR) transmission no greater than 25%.

2. The glass of claim 1, wherein the colorant portion comprises:

| | |
|---|---|
| total iron: | 0.2 to 0.8% |
| cobalt oxide: | 0 to 1,000 ppm |
| sulfides ($S^{2-}$): | 0.001 to 0.10%. |

3. The glass of claim 1, wherein the colorant portion comprises:

| | |
|---|---|
| total iron: | 0.3 to 0.6% |
| cobalt oxide: | 0 to 1,000 ppm |
| sulfides ($S^{2-}$): | 0.002 to 0.10%. |

4. The glass of claim 1, wherein the colorant portion comprises from 0.3 to 0.6% total iron.

5. The glass of claim 1, wherein the glass has a redox value ($FeO/Fe_2O_3$) of from 0.4 to 0.9.

6. The glass of claim 1, wherein the glass has a redox value ($FeO/Fe_2O_3$) of from 0.5 to 0.85.

7. The glass of claim 1, wherein the glass has a redox value ($FeO/Fe_2O_3$) of from 0.6 to 0.80.

8. The glass of claim 1, wherein the glass sheet has a visible transmission (Lta) no greater than 20%, and an infrared (IR) transmission no greater than 20%.

9. The glass of claim 1, wherein the colorant portion comprises:

| | |
|---|---|
| total iron: | 0.2 to 0.8% |
| cobalt oxide: | 0 to 1,000 ppm |
| sulfides ($S^{2-}$): | 0.001 to 0.5% |
| selenium (Se): | 0 to 0.0020% |
| chromium oxide: | 0 to 0.010% |
| erbium oxide: | 0 to 0.010% |
| nickel oxide: | 0 to 0.005%. |

10. The glass of claim 1, wherein the colorant portion comprises:

| | |
|---|---|
| total iron: | 0.3 to 0.6% |
| cobalt oxide: | 20 to 800 ppm |
| sulfides ($S^{2-}$): | 0.001 to 0.5% |
| selenium (Se): | 0 to 0.001% |
| chromium oxide: | 0 to 0.001% |
| erbium oxide: | 0 to 0.001% |
| nickel oxide: | 0 to 0.001%. |

11. The glass of claim 1, wherein the colorant portion comprises:

| | |
|---|---|
| total iron: | 0.3 to 0.6% |
| cobalt oxide: | 20 to 800 ppm |
| sulfides ($S^{2-}$): | 0.001 to 0.5% |
| selenium (Se): | 0 to 0.0001% |
| chromium oxide: | 0 to 0.0001% |
| erbium oxide: | 0 to 0.0001% |
| nickel oxide: | 0 to 0.0001%. |

12. The glass of claim 1, wherein the glass sheet is dull grayish/greenish in color, and is characterized by a % TS of no greater than 20%.

13. The glass sheet of claim 1, wherein the glass sheet has an L* of from 30–60, an a* value of from −20 to 0 and a b* value of from −10 to +45.

14. A glass sheet comprising:
a base glass portion comprising:

| Ingredient | Wt. % |
|---|---|
| $SiO_2$ | 67–75% |
| $Na_2O$ | 10–20% |
| CaO | 5–15% |
| MgO | 0–8% |
| $Al_2O_3$ | 0–5% |
| $K_2O$ | 0–5% |
| BaO | 0–2% | and a colorant portion consisting essentially of:

| | |
|---|---|
| total iron: | 0.2 to 0.8% |
| cobalt oxide: | 0 to 1,500 ppm |
| sulfides ($S^{2-}$): | 0.0001 to 1% |
| selenium (Se): | 0 to 0.0020% |
| chromium oxide: | 0 to 0.010% |
| erbium oxide: | 0 to 0.010% |
| nickel oxide: | 0 to 0.005% | wherein the glass sheet has a visible transmission (Lta) no greater than 25%, an ultraviolet (UV) transmission no greater than 20%, and an infrared (IR) transmission no greater than 25%.

15. The glass of claim 14, wherein the colorant portion consists essentially of:

| | |
|---|---|
| total iron: | 0.2 to 0.8% |
| cobalt oxide: | 0 to 1,000 ppm |
| sulfides ($S^{2-}$): | 0.001 to 0.50% |

-continued

| | |
|---|---|
| selenium (Se): | 0 to 0.0010% |
| chromium oxide: | 0 to 0.001% |
| erbium oxide: | 0 to 0.001% |
| nickel oxide: | 0 to 0.001%. |

16. The glass of claim 14, wherein the colorant portion consists essentially of:

| | |
|---|---|
| total iron: | 0.3 to 0.6% |
| cobalt oxide: | 20 to 800 ppm |
| sulfides ($S^{2-}$): | 0.001 to 0.50% |
| selenium (Se): | 0 to 0.0001% |
| chromium oxide: | 0 to 0.001% |
| erbium oxide: | 0 to 0.001% |
| nickel oxide: | 0 to 0.001%. |

17. The glass of claim 14, wherein the colorant portion consists essentially of:

| | |
|---|---|
| total iron: | 0.3 to 0.6% |
| cobalt oxide: | 20 to 800 ppm |
| sulfides ($S^{2-}$): | 0.001 to 0.50%. |

18. The glass of claim 14, wherein the colorant portion has from 0.3 to 0.6% total iron.

19. The glass of claim 14, wherein the glass has a redox value ($FeO/Fe_2O_3$) of from 0.4 to 0.9.

20. The glass of claim 14, wherein the glass has a redox value ($FeO/Fe_2O_3$) of from 0.5 to 0.85.

21. The glass of claim 14, wherein the glass sheet has a visible transmission (Lta) no greater than 20%, and an infrared (IR) transmission no greater than 20%.

22. The glass of claim 21, wherein the glass sheet has an ultraviolet (UV) transmission no greater than 20%.

23. The glass sheet of claim 14, wherein the glass sheet has an L* of from 30–60, an a* value of from −20 to 0 and a b* value of from −10 to +45.

24. A glass sheet having a visible transmission no greater than 25%, an ultraviolet (UV) transmission no greater than 20%, and an infrared (IR) transmission no greater than 25%, the glass sheet including a colorant portion consisting essentially of:

| | |
|---|---|
| total iron: | 0.2 to 0.8% |
| cobalt oxide: | 0 to 1,500 ppm |
| sulfides ($S^{2-}$): | 0.0001 to 1%. |

25. The glass of claim 24, wherein the colorant portion consists essentially of:

| | |
|---|---|
| total iron: | 0.3 to 0.6% |
| cobalt oxide: | 20 to 800 ppm |
| sulfides ($S^{2-}$): | 0.001 to 0.5%. |

26. The glass of claim 24, wherein the glass sheet has a visible transmission no greater than 20%, an IR transmission no greater than 20%, and a % TS no greater than 20%.

27. The glass sheet of claim 24, wherein the glass sheet has an L* of from 30–60, an a* value of from −20 to 0 and a b* value of from −10 to +45.

28. A method of making privacy glass, the method comprising:
  causing a batch melt including soda, lime, silica, iron and $Na_2SO_4$ to have a negative batch redox value; and
  processing the batch so as to form a privacy glass having a visible transmission no greater than 25% and in infrared (IR) transmission no greater than 25%, wherein the privacy glass includes a colorant portion comprising:

| | |
|---|---|
| total iron: | 0.2 to 0.8% |
| cobalt oxide: | 0 to 1,500 ppm |
| sulfides ($S^{2-}$): | 0.0001 to 1%. |

29. The method of claim 28, wherein at least part of the iron added to the batch is added to the batch in the form of melite.

30. The method of claim 28, wherein all iron added to the batch is added in the form of melite.

31. The method of claim 28, wherein the glass contains sulfides ($S^{2-}$) from 0.0001 to 0.10%.

* * * * *